F. B. CARLISLE.
PNEUMATIC TIRE CASING AND PROCESS FOR MAKING SAME.
APPLICATION FILED AUG. 2, 1919.

1,345,994.

Patented July 6, 1920.
5 SHEETS—SHEET 1.

F. B. CARLISLE.
PNEUMATIC TIRE CASING AND PROCESS FOR MAKING SAME.
APPLICATION FILED AUG. 2, 1919.

1,345,994.

Patented July 6, 1920.
5 SHEETS—SHEET 4.

WITNESSES

INVENTOR
Fred B. Carlisle
BY
ATTORNEYS

UNITED STATES PATENT OFFICE.

FRED B. CARLISLE, OF ANDOVER, MASSACHUSETTS, ASSIGNOR TO JOSEPH M. GILBERT, OF NEW YORK, N. Y.

PNEUMATIC-TIRE CASING AND PROCESS FOR MAKING SAME.

1,345,994.  Specification of Letters Patent.  Patented July 6, 1920.

Application filed August 2, 1919. Serial No. 314,931.

*To all whom it may concern:*

Be it known that I, FRED B. CARLISLE, a citizen of the United States, and a resident of Andover, county of Essex, State of Massachusetts, have invented certain new and useful Improvements in Pneumatic - Tire Casings and Processes for Making Same, of which the following is a specification.

The invention relates to casings which comprise the outer shoes in pneumatic tires and more particularly to that type of such casings in which layers of cord replace the customary fabric layers. The object of the invention is to provide a casing of the indicated type having a maximum period of usefulness and in which internal stresses and strains tending to produce friction or internal heat and to wear out the structure and reduce its life are obviated or reduced to a minimum. A further object of the invention is to provide a simple process whereby the improved casings may be produced with structural uniformity at a minimum cost and with a maximum of productive speed. Other objects of my invention will appear from the description hereinafter and the features of novelty will be pointed out in the appended claims. The present application is a continuation in part of another application filed by me in the United States Patent Office on or about December 6, 1916, Serial No. 135,353.

In the accompanying drawings I have illustrated examples of my improved casing in course of construction, and means which may be utilized in the production thereof, together with an example of my new apparatus whereby the production of the casing may be carried out. Referring to said drawings.

Figure 1:
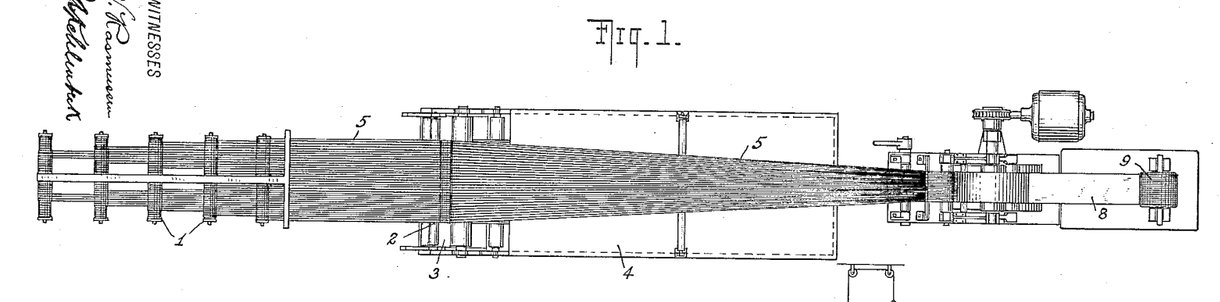
Figure 1 is a plan view of a mechanism which may be utilized in carrying out the initial steps of the process.
Figure 2:
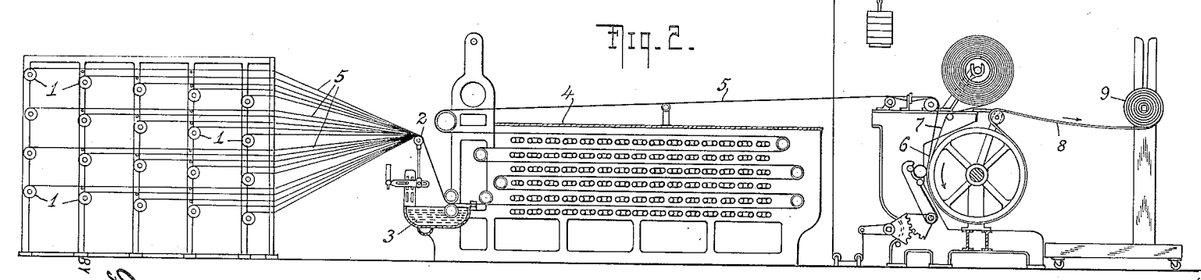
Fig. 2 is an elevation, partly in section, of Fig. 1.

In carrying out my invention, the first step is to construct a band of composite material comprising a plurality of cords of suitable diameter laid alongside of and in engagement with each other upon a sheet of unvulcanized rubber or similar material. A stout cord is employed and one of the advantages of this invention is that cotton cords may be used. This cord should be knotless and should have a tensile strength, say, of 220 lbs. for $4\frac{1}{2}$ to 5 inch casings, and, say, 165 lbs. for $3\frac{1}{2}$ to 4 inch casings. The cords, if desired, may be impregnated, coated, or otherwise treated with rubber or a rubber composition. The nature of the cords or the physical characteristics of the sheet of rubber or both may be utilized to unite the cords and rubber sheet in the form of a band of composite material of any desired width, or other means may be used for the purpose. The said composite material may be constructed in any suitable manner either continuously and cut into proper lengths or in individual lengths of the desired dimensions. For instance, a plurality of cords arranged in parallel and close relation to each other to form groups of the desired dimensions and the rubber in sheet form may be continuously fed through suitable mechanism so that the cords will be laid upon one surface of said sheet rubber and united therewith (as in Figs. 1 and 2), or the same result may be obtained by manual operation (as in Figs. 1 and 2 of my co-pending application, Serial No. 135,353, filed December 6, 1916). In either case, the construction of the composite material may be carried on as a continuous operation, the material as before stated, being cut, as needed, into the desired lengths. Suitable apparatus for the initial step is illustrated in Figs. 1 and 2 of the drawings, said mechanism, as such, forming, however, no part of the present invention and being the subject of an independent application. In these figures the cords 5 on spindles 1 are automatically and continuously gathered at 2 and then passed through a rubber solution 3, after which they pass through the drier 4. At 6, the rubberized cords meet the sheet of rubber 7 to which they adhere. The composite strip 8 is wound on reels 9. Fabric 10 is wound into the convolutions of the strip 8 on the reel 9 to prevent them from adhering to each other. The reels are wound to convenient size and stored for use as needed. The net result of this method of procedure is approximately the same as that accomplished by the corresponding specific device of my copending application above mentioned but the procedure of Figs. 1 and 2 is obviously more economical and more adapted for work on a large scale. In the composite fabric 8, the cord lengths all lie closely adjacent to and in lateral contact with each other. The desired width is governed by the number of spindles used. After the initial operation has been completed, a length of the strip 8 (combined cords 5 rubber sheet 7) is drawn upon a table and cut, preferably on the bias. The strip 8 of rubber and cords having its opposite ends cut on the bias is illustrated diagrammatically in Fig. 3 and in full size in Fig. 4. The band of composite material 8, before being cut on the bias, is preferably transferred to a table or other support 11, for instance of the kind illustrated in Figs. 5 and 6. The top of this table is preferably provided with a plurality of independently adjustable upright projections 12 arranged in two parallel rows and at a given distance from each other and fixed in their adjusted positions, the rows of projections being spaced apart sufficiently to accommodate the band of composite material between them and the projections in one row being offset with respect to those in the other row. These projections 12 serve as abutments against which to rest a straight edge or the like and accordingly are so arranged with respect to each other as to position the said straight edge at the desired angle for the purpose to be more clearly described hereinafter.

Figure 5:
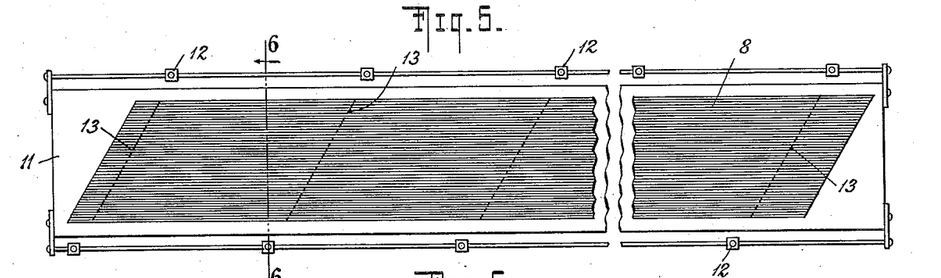
Fig. 5 illustrates another step in said process.
Figure 6:
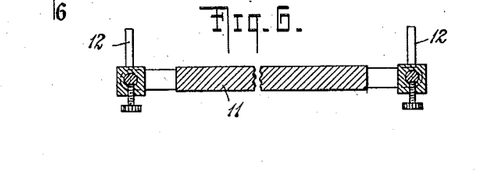
Fig. 6 is a cross-section on the line 6—6 of Fig. 5.

As before stated, the band of composite material comprising the cords 5 and rubber sheet 7 may be placed upon this table and positioned between the rows of projections 12. A straight edge is then placed against two angularly opposite projections 12, beginning, say, at the right-hand end of the strip 8 and a line is drawn diagonally across the strip as at 13 to indicate where the cut is to be made, or this first line, if not already made at a previous operation, may be cut directly. The straight edge is then successively placed against the other projections 12 in contact with the upper surface of said band of composite material and each time a line 13 is drawn with pencil or crayon, or other readily visible agent across the upper surface of the cords along the free edge of said straight edge. When the two final projections 12, located at the left hand end of each row are reached, the band of material is cut along said straight edge.

Figure 3:
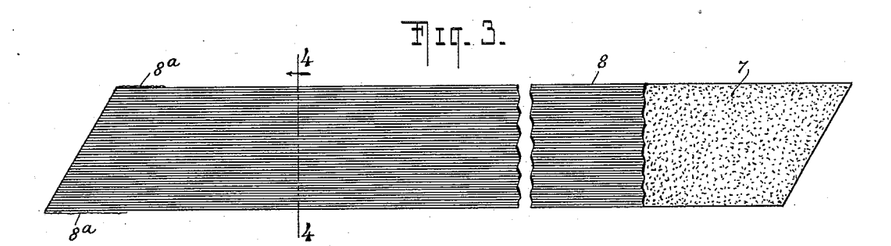
Fig. 3 is a face view, showing the product at one stage of the process of construction.
Figure 4:
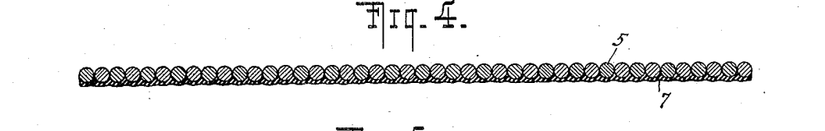
Fig. 4 is a section thereof in actual size, on the line 4—4 of Fig. 3.

As the length and width of the strip 8 and the angles at which the aforesaid markings 13 are drawn, vary according to the size of the casing to be produced, certain standards are adopted for factory practice. The length is readily calculated and as readily divided into equal divisions to form the proper spacing between the projections 12. A metal bar provided with two indentations spaced apart to correspond to said distance may be used to set the projections 12 in their proper positions. The angles are determined from a standard table and laid out with a protractor—for example, for 37x5 tires (where the strip 8 is $6\frac{1}{2}$ inches wide and comprises 45 cords) the angle may be 63°, while the angle for a 35x5 tire (strip 8, $6\frac{3}{16}$ inches wide, 43 cords) would then be 65°, and for a 36x$4\frac{1}{2}$ tire (strip 8, $6\frac{1}{4}$ inches wide, 42 cords) the angle would be $59\frac{1}{2}$°. The proper angles are set up with respect to two opposed projections 12 and the remainder of said projections are then set to their correct positions by the use of the appropriate metal spacing bar. The width of the fabric 8 may be governed by control of the mechanism of Figs. 1 and 2 but it is generally sufficient and not uneconomical to trim the lateral edges of the strip 8 until the predetermined width is secured. When the strip 8 as produced by the devices of Figs. 1 and 2 contains 45 parallel cords, it will only be necessary to trim off any projecting edge of the rubber sheet 7, such as 8ª (Fig. 3).

After the strip 8 is properly cut, trimmed and marked, as described, the ends thereof are successively introduced into a hydraulic press and subjected to a pressure of, for example, 5,000 lbs. per square inch. This flattens the two opposite ends of the band 8 (as at 17, Fig. 7) without, to any material extent, widening the band at that point, and serves as a partial compensation where, at a subsequent stage, these two parts overlap.

Short lengths of frictioned and skimmed, bias cut, duck fabric 18, equal to the diagonal width of the band 8 and previously cut to about 1¼ inch widths, are then caused to adhere to the rubber side of the strip 8 on lines approximating those defined by the pencil lines 13 of the cord side. The strip 8 is now ready to be incorporated in the carcass but generally the strips at this stage are washed with gasolene to remove grease or dirt, whereupon they are booked to serve as a supply to be drawn upon when needed.

It is apparent that in this process of building tire casings the various operations may proceed simultaneously. Thus, while the carcasses are being made, the machine of Figs. 1 and 2 may also be running and the workers at the tables 11 may also be preparing quantities of finished strips 8. These preliminary steps are so simple and efficient, however, that a relatively short run of the apparatus of Figs. 1 and 2 will suffice to produce composite fabric for a long period ahead and the same thing is true of the work at the tables 11.

Figure 7:
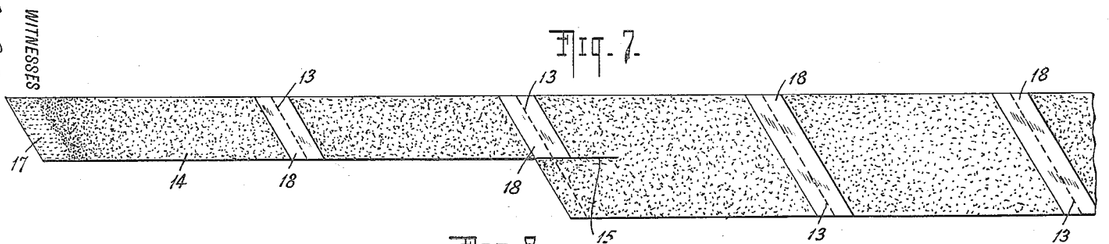
Fig. 7 is a face view similar to Fig. 3 showing a development of my invention.

Cutting the strips diagonally at their two ends gives them the shape shown in Figs. 3 and 5. It is preferable, however, to cut the ends as shown in Fig. 7, as this aids in establishing a condition of greater resistance against opening of the splice where the two ends are subsequently overlapped and united. In Fig. 7 the left end of the band or strip 8 is cut away for one half of the width of the strip and to the extent of two of the spaces between the marks 13 to form a tongue 14. The right-hand end of this strip is similarly configured except that the long tongue corresponding to tongue 14 is located in registry with the cut-away portion just beneath tongue 14, while its cut-away portion is in registry with the tongue 14. In making these cuts it is preferred to extend the longitudinal incision into the body of the strip to a short distance, as indicated at 15 to form short flaps which are wound about the annular members hereinafter referred to, for the purpose of attaching the ends of the band 8 thereto.

One of these bands of material 8, now in the condition shown in Fig. 7, is then removed from the booked supply and is spirally wound upon and between two annular members or rings 16 held in fixed, spaced and preferably parallel relation to each other. The annular members or rings referred to may be of any type and may, for instance, each comprise a plurality of wires wrapped with adhesive tape or the like to preserve the coöperative relation of said wires, but preferably they consist of a single length of piano wire spirally wound, having ferrules on the two ends of the wire, the ferrules being contiguous and having a long lap and being then soldered together, said wire being thereafter suitably wrapped with rubberized fabric. Or said rings may be constructed of flexible material such as cord or the like, the physical characteristics of the rings being predetermined according to the particular characteristics of the casing which is to be built, or in accordance with other predetermined requirements. The rings in all cases have a diameter proportionate to or in harmony with the intended diameter of the finished casing at the bead or edge portions thereof and so as to produce the desired results, whatever they may be. In winding the composite material upon the rings, the band of material is passed back and forth between the same and over and under and around said rings with the exposed surface of the rubber sheet 7 facing inwardly in the outer layer and outwardly in the inner layer or, in other words, contacting with the rings. In winding the band of composite material upon the rings, the lines 13 are used as guides to indicate the extent to which the band of composite material is to be pulled or laid between the rings 16. In other words, the said band of material, each time it passes across from one ring to another, is pulled or laid until the particular line 13 registers with the ring about which the turn is to be made. The winding operation is continued until the final end of the band of composite material reaches the starting end thereof and the flattened ends of the band or strip 8 overlap as shown at 17, Fig. 9, and are caused to adhere together firmly in that position.

Figures 8, 9:
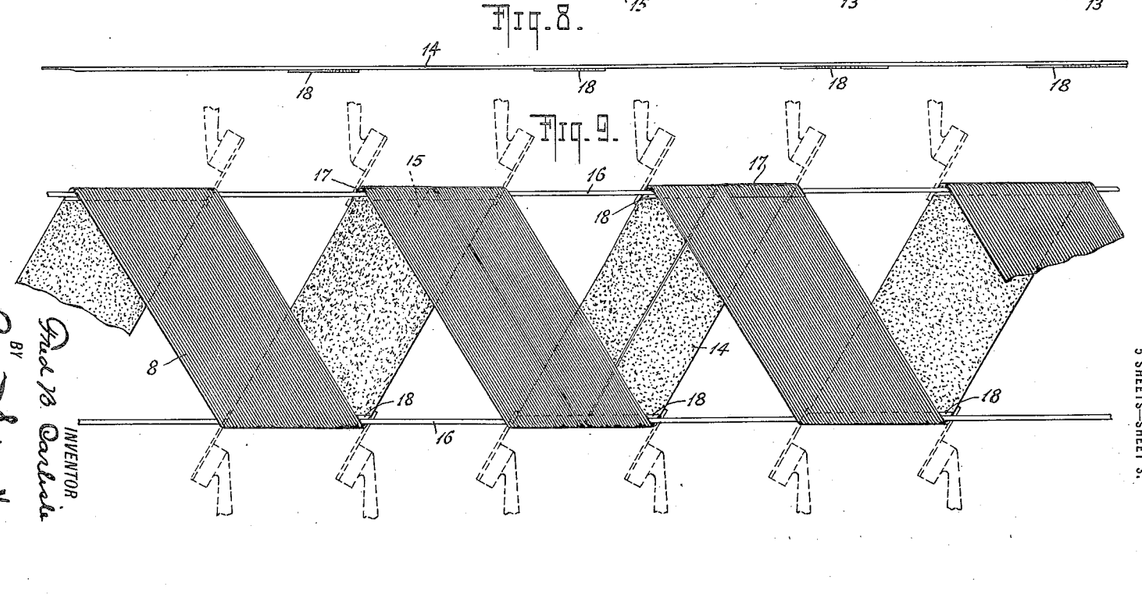
Fig. 8 is an edge view thereof.
Fig. 9 is a detail view illustrating the partly completed carcass.

It will, of course, be obvious that the arrangement and the method of procedure may be such that two or more strips, combined at their overlapping ends, may be used, but it is preferable to employ as few of these splices as possible and preferably only one splice (as when a strip shaped like Fig. 3 is employed) or one set of splices, (as per the arrangement of Fig. 9). The composite material is always combined with the rings, preferably in such a manner that the cords 5 extend diagonally across the space between the rings 16 so as to be inclined relatively thereto, the angle of inclination being optional, it being understood that the cords in the inner and outer layers are inclined in opposite directions relatively to each other. The winding operation may be so carried out that each successive convolution of the band of composite material will be closely adjacent to and in lateral contact with the previous convolution or so that a space corresponding, for instance, to the width of said band of material will exist between said convolutions both in the inner and outer layers (see Fig. 9). In the latter case, spaces between the convolutions are filled by winding a second band of composite material upon the rings in the same way as above described and so as to lie between the convolutions of the first band. If more than one band of material is utilized to carry out the process, the winding operation of the second band may be started at a point other than the point at which the winding of the first band was commenced.

When the strip 8 is thus wound as described around the rings 16, the strips of fabric 18 are automatically positioned, in the composite cylinder, thus formed, at those points thereof which contact with the annular members 16, the angle at which said strips 18 extend across the band being such that each strip will extend along and parallel with one or the other of the annular members 16. The strips 18 may be used in conjunction with or as a substitute for the lines 13, in the operation of winding the strips 8 on the rings 16.

Figure 12:
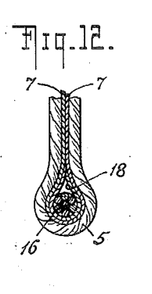
Fig. 12 is a detail of the bead.

The tension which is applied to the bands 8 in winding them upon the annular members 16 is such as to bring each strip 18 into registry with one of said members 16, the strip being folded about the same in the manner indicated in Figs. 9 and 12. It will be understood that the strips 18 are of sufficient width to extend somewhat beyond the annular members 16 and to provide an adequate protecting fold about the same. When the winding operation has been finished, the strips 18 are located in end to end relation to each other and form a substantially continuous reinforcement (except at the splice) which extends circumferentially of the annular members 16 between the same and the composite band or bands. The latter are thus protected against injurious action of the annular members 16, such as rubbing or other relative movement tending to produce friction, when the finished tire is in use. The life of the shoe and its efficiency are thus increased to a maximum extent without materially adding to the cost of manufacture and without increasing the weight of the shoe to any appreciable extent. The function of these strips 18 is further to compensate partially for the increased thickness of material at the splice where the ends of the strip 8 overlap.

Figure 10:
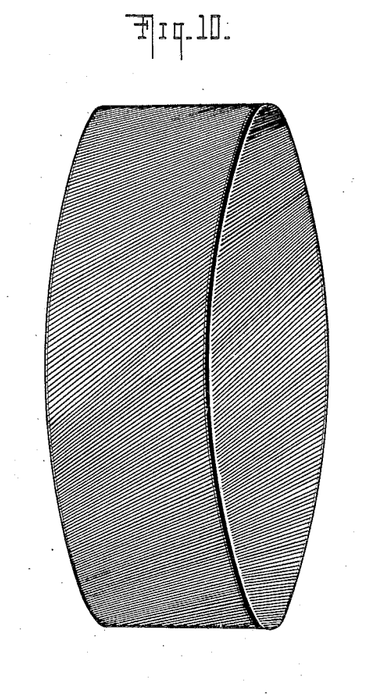
Fig. 10 is a diagrammatic perspective view of the completed carcass.

The cylinder of Fig. 10 is now complete. The operations thus far described are obviously of extreme simplicity and economy.

All of the operations and individual steps in said operations are successfully carried out with such ease as to obviate the necessity for any special or lengthy study on the part of the operator, such slight knowledge as is required to successfully perform said operations being easily acquired in a minimum of time. The necessity for highly skilled labor and the possibility of having to completely repeat a winding operation because the band either terminates short of or beyond the beginning of the winding or because of diversity of tension in various sections of the cylinder, or in one cord circuit as against another, is thus avoided. In the absence of any indications such as 13 or 18, the operator would be unable to determine whether or not the proper tension is being applied to the band during winding. The strips 18, as well as the marks 13, may serve further as a means whereby the tire or rather the shoe may be identified if for any reason this should become desirable.

The carcass of substantially cylindrical form as shown diagrammatically in Fig. 10, has an inner and an outer layer of composite material, applied in the form of a band or bands and consisting of groups of cords and sheet rubber, the rubber sheet of the outer layer of material facing the rubber sheet of the inner layer, the rings being entirely concealed. The cylinder of Fig. 10 is rolled down and the two contracting surfaces of rubber on the interior caused to adhere. Bead finishers then add a layer of so-called cord fabric, the strands of which extend in an opposite direction from that of the cords 5. Next, two or more strips of such fabric are laid over the edges of the cylinder between, but not over, the splices, i. e., at places on the exterior corresponding to those occupied in the interior by the strips 18. This serves to equalize the thickness of the material throughout the entire extent of the bead. Chafing strips are added in the usual way and the cylinder may then be lined with a sheet of rubber applied to its inner surface.

It will, of course, be apparent that, if desired or found necessary for any special purpose, the carcass may be formed with a plurality of inner and outer layers of composite material.

The use of unvulcanized rubber sheeting or other suitable material as an interior lining and the use of reinforcing strips of suitable material located along or adjacent to its edges or other amplification of the carcass will be governed according to the requirements of any specific structure which may be desired. After having been amplified or immediately after having been completed in the form of a substantially cylindrical unit, said carcass may be placed upon a collapsed air tube or bag 19 which is then inflated as shown diagrammatically in Fig. 11, the edges of said carcass being left free to assume any position to which the strains produced by the inflation of said air bag 19 may move them. As the air bag is inflated, the intermediate portions of the carcass will be bulged outwardly and the edge portions thereof will be drawn toward each other, as shown diagrammatically in Fig. 11, said edge portions, as before stated, being free to accommodate themselves to any strains exerted by said inflated air bag.

Figure 11:
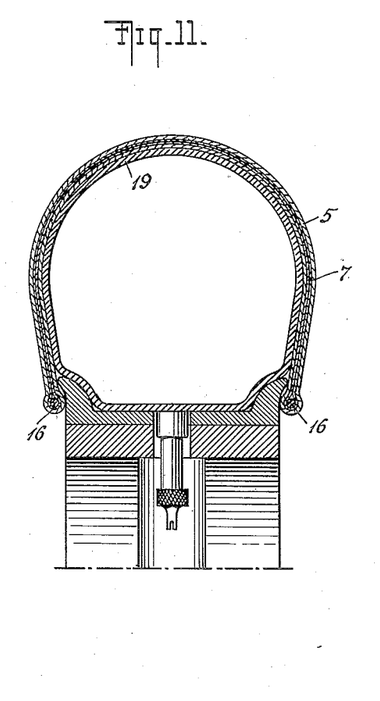
Fig. 11 is a diagrammatic sectional view showing the carcass in position on an air bag.

The cords 5 constituting the carcass are also freed to readjust their positions with the result that the carcass in its shaped form is entirely free from tension strains in the cords of which it is composed. Furthermore, the cords 5 assume their new positions due to the change from the cylindrical to the horse-shoe shape with uniformity and regularity. The result is that the carcasses are all substantially alike and the completed casings do not exhibit that diversity of performance (due to diversity of internal structure) which is so universal in fabric or even in cord-fabric tires.

The air pressure in the bag 19 is preferably 50–60 lbs. and the inflation is such as to bring the cords 5 of the carcass to the locations which they occupy in the vulcanized finished casing. The tread, side walls, etc., may then be placed upon the exterior surface of the cords 5 in any usual or appropriate manner. Due to the strength and inherent internal resilience of the structure, the side walls practically carry no part of the operating burden but serve mainly to cover the cord and obvious economics flow from these circumstances.

Instead of using an air bag and inflating same as described, a collapsible or other core of any suitable type may be substituted, the carcass in any case, as completed, being finally placed in a vulcanizing mold and subjected to the vulcanization process in the usual manner but preferably by using an air bag containing some water as the core of the mold.

During the preliminary shaping and finishing of the carcass, the opposed layers of rubber sheeting are, as stated, forced into contact with each other so as to become united and in addition to any other function which may be performed serve to maintain the convolutions of the cords of each layer in proper relation to each other and against any appreciable separation during the finishing operations. The said rubber sheeting at all stages provides a foundation upon which the cords are laid and by which said cords are efficiently maintained in the form of a band and by which, also, the cords are caused to assume their proper relative positions on the shaped carcass. As the carcass is vulcanized, the parts thereof become united in the form of a homogeneous mass of extreme strength and toughness in which relative frictional movement of cords against each other is absolutely obviated, each cord being completely surrounded by and embedded in a sheath of rubber, so that internal wear, heat and disintegration, during use is done away with, as a result of which the life of the tire casing is materially increased. By first constructing the composite material of cords and sheet rubber or other suitable material in the form of bands which are combined with the annular members or rings, it is possible to locate more cords of a given size within an inch or other unit of measurement than can be done if the cord in single or even in double strands is combined with the rings, as has heretofore been attempted. This results in a construction of much greater compactness with a consequent increased efficiency and serviceability.

Figure 13:
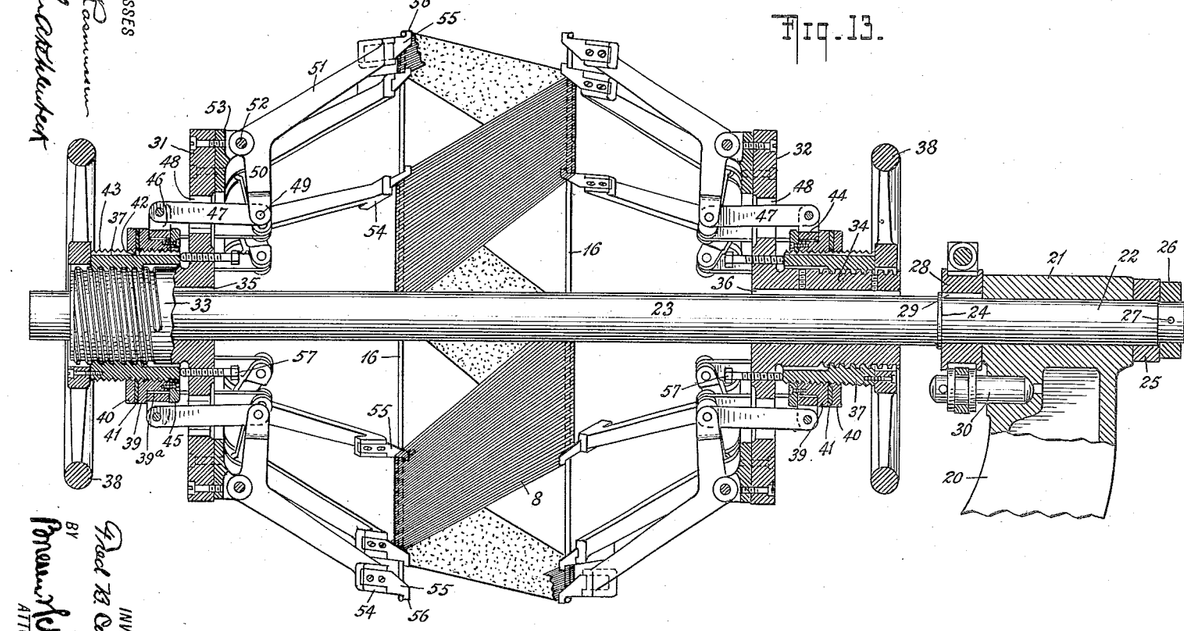
Fig. 13 is a sectional elevation of the new apparatus for producing the casing.

During the combining of the composite material with the rings 16, the latter are preferably, though not necessarily, supported in position and in proper coöperative relation to each other upon the apparatus shown in Fig. 13 and illustrated completely and in detail in my application, Serial No. 135,353, of which this application is in part a continuation. As shown in the illustrated example, the said apparatus comprises a support 20 provided at its upper end with a bearing 21 in which one end 22 of a substantially horizontal shaft 23 is located, the latter in the illustrated example being formed with an annular shoulder 24. Any suitable means may be utilized for preventing a lengthwise movement of the shaft 23 in the bearing 21; for instance, to prevent movement in one direction, the outer end 22 of the shaft 23 may project beyond the bearing 21 and be fitted with a washer 25 engaging one end of said bearing and itself held in place by a locking collar 26 secured upon the shaft 23, for instance, by means of a pin 27 extending transversely through said collar 26 and shaft 23. Lengthwise movement of the shaft 23 in the opposite direction may be prevented, as shown in the illustrated example, by means of a brake drum 28 secured upon the shaft 23 by a key and keyway 29 and located between the other end of the bearing 21 and the annular shoulder 24. In order to lock said shaft against rotation, if desired, I prefer to provide a braking device which may be of any suitable construction and, as shown, comprises a pair of bands pivoted upon a pivot pin 30 carried by the stand 20 and extending about the drum 28.

The shaft 23 further carries plates 31 and 32 which may be of duplicate construction and which are located at a distance from each other, the plates being both formed with preferably integral sleeves 33 and 34 which surround the shaft 23 and project from said plates in opposite directions. The combined plates 31, 32, and sleeves 33, 34, are preferably secured upon the shaft 23, for instance, by means of keys 35 and 36 coöperating with keyways formed in the shaft 23. In the preferred construction, at least one of said keyways is made of increased length in order to permit the plate 31 and its sleeve 33 to be moved toward and away from the plate 32 for the purpose to be more fully stated hereinafter, it being understood that an adjustment of both plates toward and away from each other may be provided for if this should be desired. The sleeves 33 and 34 are externally screw-threaded for the accommodation of collars 37 internally screw-threaded to coöperatively engage the screw-threads on the sleeves 33 and 34. These screw-threads are preferably rather coarse to provide for a quick adjustment of the collars and their connected parts upon the sleeve. In the illustrated example, operating hand wheels 38 are connected with the outer ends of said collars in any suitable manner as by means of bolts, it being understood that said hand wheels are constructed with axial openings of greater diameter than the external threads on the sleeves 33, 34, so as not to engage the latter. The collars 37 are also preferably provided with external screw threads which are preferably relatively finer than the external threads of the sleeves 33, 34, and carry internally screw-threaded rings 39, said rings 39 being adjustable lengthwise of the collars 37, as will be readily apparent. Any suitable means may be provided for locking said rings 39 in their adjusted positions upon the collars 37 as, for instance, annular locking members 40 internally screw-threaded for engagement with the external threads of the collars 37. In the preferred arrangement locking washers 41 are located between the rings 39 and the locking members 40 and are preferably held against rotation relatively to the collars 37 for instance by means of projections 42 extending into recesses 43 which project lengthwise and preferably throughout the length of said collars 37. With this arrangement the locking members 40 when being screwed up to lock the rings 39 in an adjusted position will engage the washers 41 and will be prevented thereby from causing any unintentional movement of said rings 39 whereby the adjustment thereof might be disturbed. The rings 39 are each formed with an annular recess 39$^a$ for the accommodation of link rings 44 loosely mounted therein and retained against any substantial movement relatively to the rings 39 in an axial direction by means of retaining collars 45 secured to the rings 39, the collars 45 being of sufficiently large internal diameter to avoid contact with the threads on the collars 37 and together with the recesses 39$^a$ forming annular grooves in which the link rings 44 are located. The link rings 44 are provided with a plurality of lugs 46 extending radially outward therefrom in pairs. Links 47 having one end located between each pair of lugs 46 and pivotally connected thereto, extend through radially extending apertures or slots 48 formed in the plates 31 and 32, the opposite ends of said links being pivotally connected at 49 with members 50 preferably forming integral extensions of arms 51.

The latter are pivotally connected at 52 with brackets 53 carried by the plates 31 and 32 and secured thereto in any suitable manner as by means of screws. The arms 51 preferably form an obtuse angle with the members 50 and in the assembled condition of the apparatus project toward each other, each plate 31 and 32 carrying a plurality or group of such arms. At their free ends, the arms 51 are formed with heads 54 provided with grooves in which tip plates 55 having hooks 56 at their outer ends are secured. The heads 54 are arranged at an angle to the arms 51 so as to be inclined across the major axis thereof and so as to position the tip plates 55 at an angle corresponding substantially to the angle at which the bands of composite material extend between the annular members or rings 16 previously mentioned.

In utilizing my new apparatus, the mechanism is first adjusted to properly coöperate with the internal diameters of the annular members or rings 16 which it is desired to use and which always bear a certain predetermined relation to the size of the particular tire casing under construction. This adjustment may be accomplished by first screwing the locking members 40 away from the rings 39 which in this manner are freed and may be thus rotated in one direction or the other upon the collars 37 and in the link rings 44, the latter being held against rotation relatively to the collars 37 through the coöperation of one or more links 47 and corresponding slots 48 of the plates 31 and 32, as previously pointed out. As the rings 39 are thus rotated upon the collars 37, a pull or a push will be exerted on the link rings 44, this depending upon the direction of rotation, and in any case will be transferred coincidentally to the members 50 of a given group of arms 51. The actuation of said members 50 will in turn bring about a coincidental pivotal movement of all the arms 51 of said given group upon their pivots 52 and will either move the heads 54 and tip plates 55 inwardly to contract the spaces between these elements of said group or to increase outwardly the distances therebetween. In other words, the operations so far described may be said to bring about a contraction or expansion of the means whereby the annular members or rings 16 are supported. It will be understood that the adjustment just described is always approximately such that when the arms 51 occupy their outer positions, the distance between the hooks 56 of two diametrically opposed arms 51 corresponds substantially to the internal diameters of the annular members 16 which are to be used. After the desired adjustment has been had, the locking members 40 are again screwed up to lock said rings 39 in their adjusted positions, the lock washers 41, as before stated, serving to prevent any movement of said locking members 40 from disturbing the adjustment. At this time or previously, or later on, as may be desired, the plate 31 may be adjusted toward and away from the plate 32, or both plates may be adjusted relatively to each other, as the case may be, to properly adjust the tip plates 56 of one group with respect to the tip plates 56 of the other group to properly space the annular members or rings 16 apart. This spacing of the parts also bears a predetermined relation to the size and dimensions of the casings which are to be constructed.

After the parts have been properly adjusted as described, the hand wheels 38 are rotated in directions to move the collar 37 to the right upon the sleeve 33 and to move the corresponding collar 37 to the left upon the sleeve 34. This actuation of said hand wheels serves to rotate the collars 37, rings 39, 40 and 45, and washers 41 as a unit within the link rings 44 and thus exerts a pull upon the latter which is transferred to the links 47 and members 50 and results in a coincidental pivotal movement of the arms 51 of each group toward each other whereby the heads 54 and tip plates 55 of said groups are moved inwardly or, in other words, the means for holding the annular members or rings 16 is contracted. One ring 16 is now first slipped upon the machine and over the tip plates 55 of the right hand group of arms 51 after which the co-operating hand wheel is operated in the reverse direction to move the collar 37 to the left upon the sleeve 34. This operation exerts a pushing action upon the right hand link ring 44 which is communicated to the links 47 and causes the arms 51 to be moved outwardly. This operation is continued until the tip plates 55 engage the ring 16 from the inside and firmly clamp it in position without any strain tending to distort or injure it, said ring being manipulated to bring it immediately behind the hooks 56 in its final position. The second ring 16 may now be similarly combined with the tip plates 55 of the left hand group of arms and the co-operating hand wheel actuated to clamp said ring upon said tip plates and behind the hooks 56 thereof. In order to produce uniform results in succeeding combinations of the apparatus with annular members or rings of the same diameter and to make it certain that the arms 51 and their connected parts will be moved outwardly to the same extent each time, the screws 57 may be set so as to arrest the inward movement of the collars 37 at the proper point which is determined by the internal diameters of the rings in question and is thus fixed as long as the apparatus is used with rings of any particular given diameter. In other words, the means for holding the annular members or rings 16 will be uniformly expanded each time a new set of rings is combined with the apparatus whereby the care necessary to properly actuate the mechanism and to avoid a distortion of or injury to said rings is reduced to a minimum.

After two rings have been properly supported upon the machine in the desired fixed relation to each other, the combining of the bands of composite material may be proceeded with. In carrying out this operation as shown in the illustrated example, one end of a band of composite material is temporarily secured to one of the rings 16 at some point of its periphery as hereinbefore described, and in the space between two adjacent tip plates 55 of one of the groups. The said band of material is then passed in a helical direction over to the second ring to the space between two adjacent tip plates 55 which is advanced with respect to the space between the tip plates at which the operation started. The said band thus extends diagonally across the space between the two rings in a direction inclined thereto and is passed around the second ring and back to the first ring to a space between two adjacent tip plates which again is advanced with respect to the last previous space. The applying of the band of material is continued in this manner and is passed back and forth between and around the two rings in the form of a spiral winding, the operation continuing for instance until the first end of the band is reached, in which case both ends of the band may be secured for instance by means of binder tape or other suitable agency, or until the terminating end of the particular band being wound is reached. At the completion of the operation just described the carcass will have, for instance, the appearance shown by way of example in Fig. 9, in which it will be seen that spaces corresponding to the width of the band of composite material exist between the convolutions of said band. In order to fill these spaces and complete the carcass, a second band of composite material is applied to the rings in the same way as the first and so that the convolutions of said second band will occupy the spaces between the convolutions of the first band. In the preferred method of operation a single band is used to complete the entire cylinder of Fig. 10 which means that the initial set of the fingers 55 on one side of the machine toward the corresponding opposed fingers is such that no spaces are left between the windings. During the winding of the bands, the material in passing between the rings is drawn so as to bring one of the marks or lines 13 or one of the strips 18 on said bands, or both, into registry with a ring, said marks or lines 13 or strips 18 serving as a guide for the operator and assuring uniform results and also making it absolutely certain that the ends of the composite bands will meet properly. These marks or lines 13, as well as the strips 18, always extend transversely to the bands of material at angles corresponding to the circumferential direction of the rings 16 relatively to the bands when the latter are applied thereto and thus may always be brought into proper registry with said rings during the winding operation.

After the carcass has been completed, the hand wheels 38 are actuated to move the arms 51 inwardly whereby the rings are released so that the finished carcass may be readily removed from the apparatus and converted into a finished casing. During the winding of the bands upon the rings the mechanism may be held stationary by the band brake hereinbefore mentioned or if desired said brake may be released to permit the shaft 23 to rotate in the bearing 21. In the latter case, the rings may be intermittently rotated to facilitate the winding operation and to bring the mechanism to positions most comfortable to the operator as the winding proceeds.

When the rings are in position on the apparatus, it will be seen that the tip plates 55 engage said rings from the inside at equidistant intervals and in addition to their supporting function serve as guides for accurately indicating the spaces in which the bands are to be passed around the rings. The distance between adjacent tip plates of a group also serves to indicate the width which is desirable in the composite bands to most efficiently carry out the process in each case. In addition, the hooks 56 of said tip plates 55 prevent the rings from being drawn from the latter and toward each other under the tension of the bands during the winding operation. The tip plates 55 and their hooks 56 are constructed of relatively thin material and thus do not interfere with the winding of the bands to any appreciable extent. In all cases, inner and outer layers of composite bands are formed on the rings with the rubber strips in opposed face to face relation to each other. The bands in the preferred form extend diagonally across the space between said rings and include a maximum number of cords to the inch whereby a structure of great compactness and having relatively high powers of resistance is produced which at the same time produces an efficient amount of flexibility and resiliency in the finished casing.

It will be seen that the casing is built up initially in substantially the form of a tubular cylinder without the use of a core of any kind, this arrangement permitting the composite bands to be wound completely around, under and over the rings in one general direction and doing away with the necessity for alternate right and left hand windings, while all the cord lengths from ring to ring in every convolution are under the same tension. The use of hooks or other projections built into the tire for the accommodation of the cords is also avoided, this absence of injurious projections such as were heretofore used, reducing the internal wear in the casings and preventing injury thereto due to the effects of said hooks or projections during use of the case. The process produces a casing of much greater efficiency than heretofore which is capable of being manufactured in a simple manner and which may be of relatively light weight without effecting its wearing qualities. These tires require practically no attention in use and are rarely subject to blow-outs, but wear down into the cord structure. Even then they can be readily retreaded. A casing constructed according to this process is further capable of effectively withstanding the effects of high speed for a much greater period of time than heretofore and is easily repaired. It requires less air pressure for its proper inflation, which make the tire ride more easily, affords a better traction, and avoids blow-outs due to excessive internal pressure. At the same time this process eliminates a large percentage of the present cost of labor in building the casing. Owing to the tacky condition of the rubber elements of the casing and the impregnation of the cords with rubber cement the whole becomes closely united during vulcanization and forms a structure capable of withstanding severe strains without becoming separated into its constituent parts. A maximum of traction and braking efficiency is also obtained.

This process makes it possible to manufacture Dunlop or clencher tires with equal facility, beads in the case of the latter type of tires being formed in the usual manner.

Various changes in the specific details shown and described may be made within the scope of the claims without departing from the spirit of the invention.

I claim:

1. The process of making pneumatic tire casings which consists in supporting a pair of spaced annular members from the inside at individual points, spaced apart to define winding spaces, and winding a band of composite material comprising a rubber sheet carrying adhesively upon its surface a group of parallel adjacent cords between and around said annular members at said winding spaces to form a cylindrical unit, said band of material corresponding in width to an integral division of the width of said winding spaces, the latter thus constituting multiples of the width of the band.

2. The process of making pneumatic tire casings which consists in applying to a strip of sheet rubber a series of parallel cords in lateral engagement with each other and in surface engagement with said strip of sheet rubber to form a band of composite material, cutting the ends of said band diagonally, providing said band on the cord side with transverse visible indicators at intervals, supporting a pair of rings in spaced and parallel relation to each other and against relative circumferential movement, temporarily securing one end of said band of material to one of said rings, passing said band of material back and forth between said rings in a helical direction and around said rings at the transverse visible indicators to form inner and outer layers of composite material, continuing the combination of composite material with the rings until a cylindrical unit is formed and converting said unit into a finished casing.

3. The process of making pneumatic tire casings which consists in constructing a composite band of material comprising a sheet of rubber carrying adhesively upon its surface a plurality of parallel cords laid in longitudinal engagement with each other upon the same, providing said band, upon at least one surface, with indicating means located at spaced intervals, supporting two annular members in spaced relation to each other and winding said band of material about and between said members under a tension sufficient to bring said indicating means into registry therewith.

4. The process of making pneumatic tire casings which consists in constructing a composite band of material comprising a sheet of rubber carrying adhesively upon its surface a plurality of parallel cords laid in longitudinal engagement with each other upon the same, producing a plurality of indicating lines upon at least one surface of said band so as to extend diagonally thereof, supporting two annular members in spaced relation to each other and winding said band of material about and between said annular members under a tension sufficient to bring said indicating lines into registry therewith.

5. The process of making pneumatic tire casings which consists in constructing a composite band of material comprising a sheet of rubber carrying adhesively upon its surface a plurality of parallel cords laid in longitudinal engagement with each other upon the same, producing a plurality of indicating lines diagonally across the cord surface of the band at regular intervals, applying diagonally laid strips to the rubber surface of the band in registry with said indicating lines, supporting two annular members in spaced relation to each other and winding said band of material about and between said annular members under a tension sufficient to bring said indicating lines into registry therewith whereby the said strips are folded about the annular members in longitudinal registry with each other and act as reinforcements.

6. A foundation unit for pneumatic tire casings comprising a pair of annular members spaced apart and a band of composite material comprising a sheet of rubber carrying adhesively upon its surface a group of parallel laterally contiguous cords, said band passing diagonally between and around said annular members to form inner and outer layers, said band having indicator marks thereon at points corresponding to where the band turns around the annular members.

7. A casing for pneumatic tires comprising a pair of annular members spaced apart and a band of composite material comprising a sheet of rubber carrying adhesively upon its surface a group of parallel laterally contiguous cords, said band passing diagonally between and around said annular members to form inner and outer layers, said band having indicator marks thereon at points corresponding to where the band turns around the annular members and a tread construction built upon the outer layer of the wound band, the whole being vulcanized into a homogeneous mass.

8. In a casing for pneumatic tires, a pair of annular members spaced apart in axial registry, continuous layers of cords extending around and between said members and reinforcing means carried by said layers and folded therewith about said annular members so as to occupy the space between the annular members and the cord layers.

9. In a casing for pneumatic tires, a pair of annular members spaced apart in axial registry, a band comprising a sheet of rubber carrying on its surface a plurality of cords located in longitudinal engagement with each other, said band being spirally wound about and between said members and a plurality of reinforcements located at intervals upon said band and registering with each other in end to end arrangement between said annular members and said band when combined therewith.

10. In a carcass for pneumatic tire casings, a pair of annular members spaced apart in axial registry, a band comprising a sheet of rubber and a plurality of rubberized cords laid thereon in longitudinal engagement with each other, said band being spirally wound about and between said members and individual fabric strips extending transversely across the inner surface of said sheet of rubber on the bias and at spaced intervals, said fabric strips being folded about said annular members, the strips registering with each other longitudinally when the band is combined with the members so as to form substantially continuous reinforcements between said members and said band.

11. In a carcass for pneumatic tire casings, a pair of annular members spaced apart in axial registry, a band comprising a sheet of rubber and a plurality of rubberized cords laid thereon in longitudinal engagement with each other, said band being spirally wound about and between said members, visible indicating lines extending across the cord surface of the band at regular intervals and individual fabric strips extending diagonally across the rubber surface of the band in registry with the indicator lines, said fabric strips being folded about said annular members, the strips registering with each other longitudinally when the band is combined with the members so as to form substantially continuous reinforcements between said members and said band while the indicating lines also register longitudinally where the band folds about the annular members.

12. A band of material for use in constructing cord tires comprising a sheet of rubber carrying upon its surface a plurality of cords located in longitudinal engagement with each other and a plurality of diagonally positioned visible indicators located at intervals upon one surface of the band.

13. A band of material for use in constructing cord tires comprising a sheet of rubber carrying upon its surface a plurality of cords located in longitudinal engagement with each other and a plurality of reinforcements located at intervals upon the rubber surface of said band and extending diagonally across and transversely of the band.

14. A band of material for use in constructing cord tires comprising a sheet of rubber carrying upon its surface a plurality of rubberized cords laid thereon in longitudinal engagement with each other and a plurality of narrow fabric strips located at intervals upon the exposed surface of said sheet of rubber and extending across the same on the bias.

15. A band of material for use in constructing cord tires comprising a sheet of rubber carrying upon its surface a plurality of rubberized cords laid thereon in longitudinal engagement with each other and a plurality of narrow fabric strips located at intervals upon the exposed surface of said sheet of rubber and extending across the same on the bias and a plurality of indicating lines extending on the bias over the cord surface of the band in registry with the fabric strips.

16. A band of material for use in constructing cord tires comprising a sheet of rubber carrying upon its surface a plurality of cords located in longitudinal engagement with each other, said band having its ends diagonally cut and being reduced in width for a portion of each of its opposite ends to form tongues extending from a wider part of the band, and a longitudinal slit in said band back of where the tongue begins to produce a short flap for positioning the end of the band, each of the two tongues being arranged to lie alongside of each other in the completed wound carcass to form a splice.

17. A band of material for use in constructing cord tires comprising a sheet of rubber carrying upon its surface a plurality of rubberized cords laid thereon in longitudinal engagement with each other, relatively narrow tongues forming continuations of said band at opposite ends and located at opposite sides of the longitudinal center line of said band, a short longitudinal slit at the longitudinal center line of the band at the roots of said tongues to produce short flaps for positioning the ends of the band, and a plurality of visible indicators located at intervals upon one surface of said band and extending across the same on the bias.

18. In a carcass for pneumatic tire casings, a pair of annular members spaced apart in axial registry, a band comprising a sheet of rubber carrying upon its surface a plurality of rubberized cords laid thereon in longitudinal engagement with each other, said band being spirally wound about and between said members, relatively narrow tongues having diagonally cut edges and forming continuations of said band at opposite ends, and lying alongside of each other to form a splice when said band is combined with said members and individual fabric strips extending transversely across the rubber surface of said band on the bias and at spaced intervals, said fabric strips being folded about said annular members and registering with each other longitudinally when said band is combined with said members to form substantially continuous reinforcements between said members and said band except at the splice.

In testimony whereof I have hereunto set my hand.

FRED B. CARLISLE.